United States Patent
Kawai

(10) Patent No.: US 9,883,145 B2
(45) Date of Patent: Jan. 30, 2018

(54) ONBOARD CAMERA AUTOMATIC CALIBRATION APPARATUS

(71) Applicant: TOSHIBA ALPINE AUTOMOTIVE TECHNOLOGY CORPORATION, Iwaki-Shi (JP)

(72) Inventor: Kiyoyuki Kawai, Iwaki (JP)

(73) Assignee: TOSHIBA ALPINE AUTOMOTIVE TECHNOLOGY CORPORATION, Iwaki-Shi (JP)

(*) Notice: Subject to any disclaimer, the term of this patent is extended or adjusted under 35 U.S.C. 154(b) by 475 days.

(21) Appl. No.: 13/777,173

(22) Filed: Feb. 26, 2013

(65) Prior Publication Data

US 2013/0307982 A1 Nov. 21, 2013

(30) Foreign Application Priority Data

May 15, 2012 (JP) .................................. 2012-111897

(51) Int. Cl.
*H04N 7/18* (2006.01)
*G06K 9/00* (2006.01)
(Continued)

(52) U.S. Cl.
CPC ............ *H04N 7/18* (2013.01); *G06K 9/00791* (2013.01); *G06K 9/00798* (2013.01);
(Continued)

(58) Field of Classification Search
CPC ... H04N 7/18; G06T 7/80; G06T 2207/30256; G06T 2207/30244; G06T 2207/10016;
(Continued)

(56) References Cited

U.S. PATENT DOCUMENTS

2008/0007619 A1* 1/2008 Shima et al. ................ 348/118
2008/0031514 A1* 2/2008 Kakinami ...................... 382/154
(Continued)

FOREIGN PATENT DOCUMENTS

JP 7-77431 3/1995
JP 2004-198159 7/2004
(Continued)

OTHER PUBLICATIONS

Hu et al. "Moving Objects Detection from Time-Varied Background: An Application of Camera 3D Motion Analysis," (1999) 3-D Digital Imaging and Modeling.*
(Continued)

*Primary Examiner* — Joseph Ustaris
*Assistant Examiner* — Jill Sechser
(74) *Attorney, Agent, or Firm* — Oblon, McClelland, Maier & Neustadt, L.L.P.

(57) ABSTRACT

According to one embodiment, an onboard camera automatic calibration apparatus includes at least a road surface point selection unit, an amount-of-rotation-around-Z-axis calculation unit and a coordinate rotation correction unit. The road surface point selection unit selects multiple points not less than three on a road surface in a predetermined image among the multiple images obtained by an onboard camera and selects multiple combinations of two points from among the multiple points. The amount-of-rotation-around-Z-axis calculation unit determines, in a camera coordinate system with an optical axis as a Z axis, an amount of rotation around the Z axis such that the road surface is parallel to an X axis, based on the multiple combinations and motion vectors. The coordinate rotation correction unit performs rotation correction around the Z axis for the images obtained by the onboard camera based on the determined amount of rotation around the Z axis.

10 Claims, 10 Drawing Sheets

(51) Int. Cl.
  *G06K 9/32* (2006.01)
  *G06T 7/80* (2017.01)
(52) U.S. Cl.
  CPC .............. *G06K 9/3208* (2013.01); *G06T 7/80* (2017.01); *G06T 2207/10016* (2013.01); *G06T 2207/20021* (2013.01); *G06T 2207/30244* (2013.01); *G06T 2207/30256* (2013.01)
(58) Field of Classification Search
  CPC ........ G06T 2207/20021; G06K 9/3208; G06K 9/00798; G06K 9/00791
  See application file for complete search history.

(56) References Cited

U.S. PATENT DOCUMENTS

| | | | |
|---|---|---|---|
| 2009/0299684 A1* | 12/2009 | Imanishi et al. | 702/150 |
| 2010/0027844 A1* | 2/2010 | Akita | 382/103 |
| 2010/0245592 A1* | 9/2010 | Inui et al. | 348/187 |
| 2011/0063436 A1* | 3/2011 | Mizutani | 348/135 |
| 2011/0115922 A1* | 5/2011 | Shimizu | 348/188 |
| 2011/0298988 A1* | 12/2011 | Kawai | G06T 5/006 348/699 |

FOREIGN PATENT DOCUMENTS

| | | |
|---|---|---|
| JP | 2008-11174 | 1/2008 |
| JP | 2010-107348 | 5/2010 |
| JP | 2010-193428 | 9/2010 |

OTHER PUBLICATIONS

Extended European Search Report dated Sep. 2, 2013, in European Patent Application No. 13160182.5.
Zhencheng Hu, et al., "Moving Objects Detection from Time-varied Background: An Application of Camera 3D Motion Analysis", 3-D Digital Imaging and Modeling, 1999, Proceedings, XP010358805, Oct. 1999, pp. 59-67.
Hoi-Kok Cheung, et al., "Accurate Distance Estimation Using Camera Orientation Compensation Technique for Vehicle Driver Assistance System", 2012 IEEE International Conference on Consumer Electronics (ICCE), XP032124864, 2 pages.
U.S. Appl. No. 13/408,377, filed Feb. 29, 2012, Kiyoyuki Kawai.
Office Action dated Sep. 6, 2016 in Japanese Patent Application No. 2012-111897.
Office Action dated Feb. 2, 2016 in Japanese Patent Application No. 2012-111897.

* cited by examiner

ONBOARD CAMERA AUTOMATIC CALIBRATION APPARATUS

CROSS-REFERENCE TO RELATED APPLICATIONS

This application claims the benefit of priority of Japanese Patent Application No. 2012-111897, filed May 15, 2012, the entire contents of which are incorporated herein by reference.

FIELD

Embodiments described herein relate generally to an onboard camera automatic calibration apparatus.

BACKGROUND

The number of vehicles such as automobiles mounted with an onboard camera for picking up images of surrounding circumstances around the vehicles has been increasing. The images picked up by the onboard camera are very convenient because they can be used for support of steering for parking, judgment of a possibility of a crash between the vehicle and an object, and so on.

In the case of using the images picked up by the onboard camera, it is important to accurately calibrate the mounting angle of the onboard camera relative to a road surface. Onboard camera calibration methods of this kind include a method using an already-known object (calibration target) arranged at a predetermined position on a road surface in advance.

In the case of calibrating the mounting angle of the onboard camera relative to a road surface using the calibration target installed on the road surface in advance, however, the state of the vehicle at the time of calibration being performed does not necessarily correspond to the actual state of the vehicle at the time of the vehicle running. For example, the mounting angle of the onboard camera relative to the road surface changes depending on the number of passengers or fluctuation in the load. Therefore, the calibration using a calibration target is insufficient as calibration for the mounting angle at the time of the vehicle is running. The mounting angle of the onboard camera relative to the road surface also changes due to change over the years after the calibration using a calibration target.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION

Hereinbelow, a description will be given of an onboard camera automatic calibration apparatus according to embodiments of the present invention with reference to the drawings.

In general, according to one embodiment, an onboard camera automatic calibration apparatus includes a camera, a motion vector calculation unit, a road surface point selection unit, an amount-of-rotation-around-Z-axis calculation unit and a coordinate rotation correction unit.

The camera is provided on a vehicle to obtain an image of surroundings of the vehicle. The motion vector calculation unit is configured to determine motion vectors among the multiple images obtained by the camera. The road surface point selection unit is configured to select points not less than three on a road surface in a predetermined image among the multiple images. The road surface point selection unit is further configured to select multiple combinations of two points from among the points not less than three on the road surface.

The amount-of-rotation-around-Z-axis calculation unit is configured to determine, in a camera coordinate system with an optical axis as a Z axis, an amount of rotation around the Z axis. This amount is determined such that the road surface is parallel to an X axis, based on the multiple combinations of the two points and motion vectors each corresponding to each point of the multiple combinations of the two points. The coordinate rotation correction unit is configured to perform rotation correction around the Z axis for the images obtained by the camera based on the amount of rotation around the Z axis determined by the amount-of-rotation-around-Z-axis calculation unit.

(First Embodiment)

Figure 1:
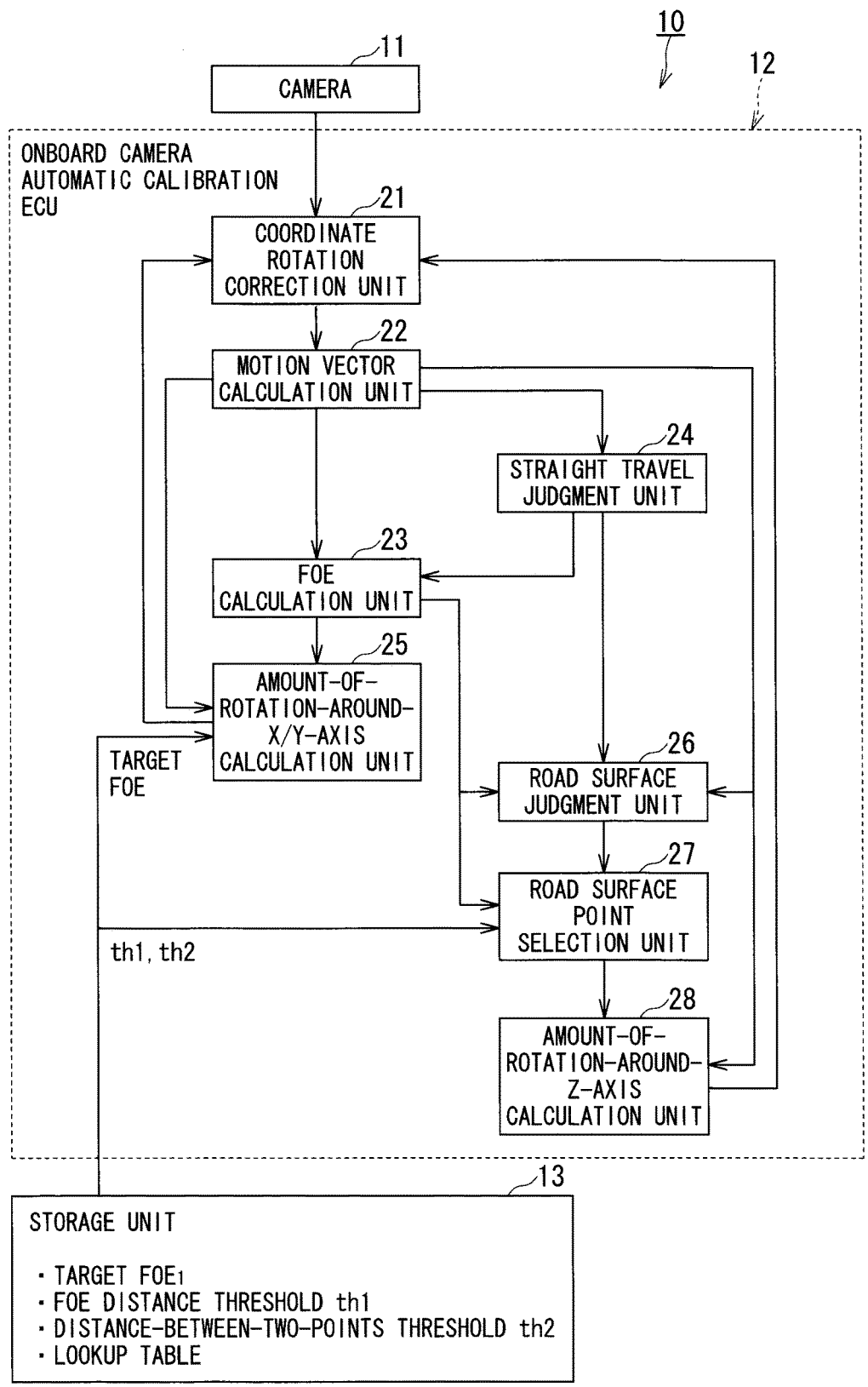
FIG. 1 is a whole block diagram showing an example of an onboard camera automatic calibration apparatus according to a first embodiment of the present invention.

FIG. 1 is a whole block diagram showing an example of an onboard camera automatic calibration apparatus 10 according to a first embodiment of the present invention.

The onboard camera automatic calibration apparatus 10 has a camera 11, an onboard camera automatic calibration ECU (Electronic Control Unit) 12 and a storage unit 13.

The camera 11, which is configured by a CCD (Charge Coupled Device) image sensor or a CMOS (Complementary Metal Oxide Semiconductor) image sensor, captures an image of surroundings of a vehicle such as a passenger car for private use, generates an image signal and gives the image signal to the onboard camera automatic calibration ECU (hereinafter referred to as the automatic calibration ECU) 12.

For example, in the case of monitoring the back of the vehicle, the camera 11 is provided near a license plate at a rear part of the vehicle or at an upper part of a rear window. In this case, it is desirable that the camera 11 is provided such that its optical axis is parallel with a road surface or the optical axis is in a slightly downward direction from a line parallel with the road surface. The camera 11 may be equipped with a wide-angle lens or a fisheye lens so that a wider image of the outside of the vehicle can be acquired. In the case of monitoring the lateral direction of the vehicle, the camera 11 is arranged near a side mirror. Of course, it is also possible to capture a wider image of the surroundings of the vehicle by using multiple cameras 11.

In this embodiment, an example will be described in which the camera 11 is provided near the license plate at the rear of the vehicle or at an upper part of the rear window such that its optical axis is parallel with a road surface.

The automatic calibration ECU 12 is configured by a CPU and storage media such as a RAM and a ROM. The CPU of the automatic calibration ECU 12 loads an automatic calibration program stored in the storage medium such as the ROM and data required to execute this program, onto the RAM. Then, the CPU acquires information about a mounting angle of the camera 11 relative to a road surface while the vehicle is running, on the basis of an image acquired by the camera 11, in accordance with the automatic calibration program, and performs rotation correction of the image on the basis of this information.

The RAM of the automatic calibration ECU 12 provides a work area for temporarily storing the program to be executed by the CPU and the data. The storage media of the automatic calibration ECU 12, such as the ROM, stores the automatic calibration program and various data required to execute the program.

The storage media including the ROM have a configuration in which a CPU-readable recording medium, such as a magnetic or optical recording medium and a semiconductor memory, is included, and a part or all of the program and data in the storage media may be configured so as to be downloaded through an electronic network, via a network connection unit not shown.

In this case, the network connection unit is implemented with various protocols for information communication corresponding to the form of the network, and it connects the automatic calibration ECU 12 with electric equipment such as the ECU of another vehicle via the electronic network in accordance with the various protocols. Electric connection via the electronic network can be applied to the connection. Here, the electronic network means all information communication networks using telecommunications technology, and it includes a telephone communication network, an optical fiber communication network, a cable communication network, a satellite communication network and the like in addition to a wireless/wired LAN (Local Area Network) and the Internet network.

The storage unit 13 is a nonvolatile memory to and from which the automatic calibration ECU 12 can write and read data, and it stores a target $FOE_1$ (x1, y1), which is information about coordinates of a target focus of expansion according to the present embodiment, an FOE distance threshold th1, a distance-between-two-points threshold th2, a lookup table and the like. These pieces of information may be updated via the electronic network or via a portable storage medium such as an optical disk.

The target $FOE_1$ (x1, y1) according to the present embodiment is set to the origin (0, 0) (target $FOE_1$=(0, 0)). This target $FOE_1$ is used for correction of rotation around X and Y axes by the automatic calibration ECU 12. The FOE distance threshold th1 and the distance-between-two-points th2 are used by the automatic calibration ECU 12 as thresholds at the time of extracting a road surface point. The lookup table is referred to by the automatic calibration ECU 12 when necessary at the time of performing rotation correction of an image. If matrix operation is performed when the automatic calibration ECU 12 performs rotation correction of an image, the lookup table may not be used and may not be stored in the storage unit 13.

As shown in FIG. 1, the CPU of the automatic calibration ECU 12 functions at least as a coordinate rotation correction unit 21, a motion vector calculation unit 22, an FOE calculation unit 23, a straight travel judgment unit 24, an amount-of-rotation-around-X/Y-axis calculation unit 25, a road surface judgment unit 26, a road surface point selection unit 27 and an amount-of-rotation-around-Z-axis calculation unit 28 under the automatic calibration program. Each of the units 21 to 28 uses a predetermined work area of the RAM as a place for temporarily storing data. These function realization units may be configured by hardware logic such as a circuit without using a CPU.

A camera coordinate system used in the present embodiment will be briefly explained.

Figure 2:
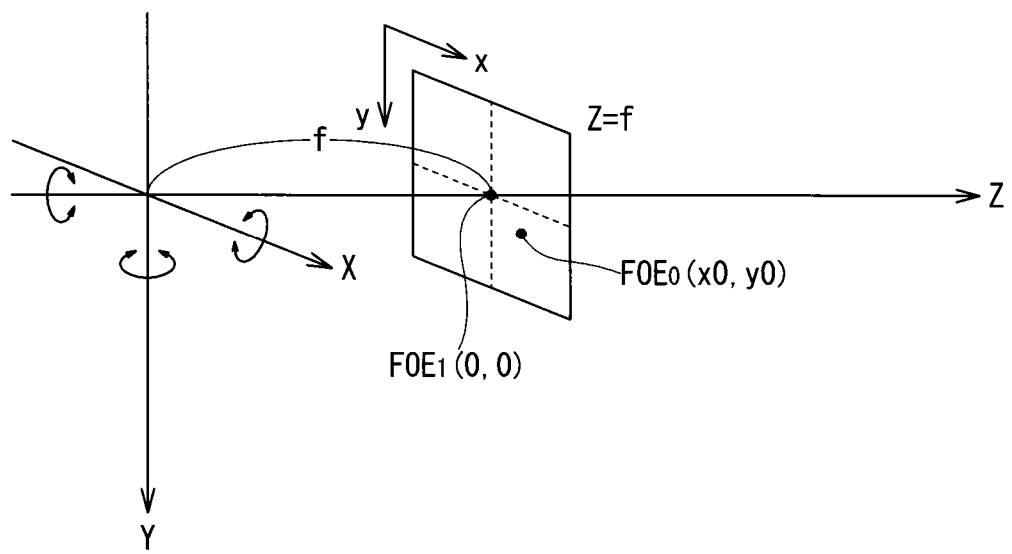
FIG. 2 is a diagram showing a relationship between a camera coordinate system according to the first embodiment and a screen coordinate system on a camera projection surface.

FIG. 2 is a diagram showing a relationship between a camera coordinate system according to the first embodiment and a screen coordinate system on a camera projection surface 31. In the present embodiment, the camera coordinate system is given as (X, Y, Z), and the screen coordinate system is given as (x, y) (or (x, y, z)). The camera coordinate system (X, Y, Z) is a Cartesian coordinate system with the center of the camera 11 as an origin.

In the present embodiment, it is defined that the Z axis, X axis and Y axis of the camera coordinate system correspond to a road surface, the lateral direction of the vehicle and the vertical direction of the vehicle, respectively. The origin (0, 0) (or (0, 0, f)) of the screen coordinate system is assumed to be a point of intersection between the optical axis and the camera projection surface 31. It is assumed that the road surface is parallel with the longitudinal direction (straight travel direction) and lateral direction of the vehicle.

In the present embodiment, an image obtained by the camera 11 is rotation-corrected so that the optical axis of the camera 11 is parallel to the road surface (Z axis).

In the camera coordinate system, the camera projection surface 31 is a surface on which Z=f is satisfied. The focal distance of the camera 11 is indicated by f. The camera 11 obtains an image of the surroundings of the vehicle projected on the camera projection surface 31. It is assumed that, when the three-dimensional coordinates in the camera coordinate system of a certain point P is (X, Y, Z), the coordinates of a point p, which is the point P projected on the camera projection surface 31, are indicated by p(x, y, z).

The camera 11 moves in parallel with the road surface as the vehicle moves. Therefore, the origin of the camera coordinate system and the origin of the screen coordinate system move in parallel with the road surface as the vehicle moves.

It is known that, when the camera 11 moves straight, coordinates of a focus of expansion (FOE) can be determined from a point of intersection of extended lines of motion vectors (u, v) corresponding to points (x, y) of a still subject on the camera projection surface 31.

The direction of travel of the camera 11 can be indicated by a line connecting the origin (0, 0, 0) of the camera coordinate system and the focus of expansion on the camera projection surface 31. Therefore, in the present embodiment, when the camera 11 is mounted with an ideal mounting angle, that is, when the optical axis direction corresponds to the Z axis, the coordinates of the focus of expansion correspond to the origin (the target focus of expansion $FOE_1$ (0, 0)).

However, when the mounting angle of the camera 11 relative to the road surface deviates from the ideal mounting angle, the coordinates of the focus of expansion determined from the point of intersection of extended lines of the motion vectors (u, v) corresponding to the points (x, y) of the still subject on the camera projection surface 31 (hereinafter referred to as a current focus of expansion $FOE_0$ (x0, y0)) deviates from the target $FOE_1$. As causes of the mounting angle of the camera 11 relative to the road surface deviating from the ideal mounting angle, for example, inclination of the vehicle due to passengers or a load in the vehicle and change over the years are given.

Accordingly, the onboard camera automatic calibration apparatus 10 according to the present embodiment acquires information about the mounting angle of the camera 11 relative to the road surface while the vehicle is running, on the basis of an image acquired by the camera 11, and performs rotation correction of the image on the basis of this information.

More specifically, the coordinate rotation correction unit 21 performs rotation correction around the X axis and the Y axis for the image picked up by the camera 11 on the basis of an amount of rotation around the X axis θx and an amount of rotation around the Y axis θy determined by the amount-of-rotation-around-X/Y-axis calculation unit 25, respectively. The coordinate rotation correction unit 21 performs rotation correction around the Z axis for the image picked up by the camera 11 on the basis of an amount of rotation around the Z axis θz determined by the amount-of-rotation-around-Z-axis calculation unit 28.

A method for acquiring the amount of rotation around the X axis θx and the amount of rotation around the Y axis θy will be described. The amount of rotation around the X axis θx and the amount of rotation around the Y axis θy can be determined as amounts of rotation for converting the current focus of expansion $FOE_0$ to the target $FOE_1$.

The motion vector calculation unit 22 calculates the motion vector (u, v) for each pixel from multiple images picked up by the camera 11, using a block matching method or a gradient method. In the description below, an example will be shown in which the motion vector calculation unit 22 calculates the motion vector (u, v) between a current image and an image which is one frame before the current image, and determines coordinates (x0, y0) of the focus of expansion $FOE_0$ of the current image on the basis of the motion vector.

When the camera 11 moves straight (the vehicle moves forward or backward), the following relationship exists between the motion vector (u, v) corresponding to the point (x, y) of the still subject on the camera projection surface 31 and the current focus of expansion $FOE_0$ (x0, y0).

$$u/v=(x-x0)/(y-y0) \qquad (1)$$

Therefore, if the motion vector (u, v) is obtained for two or more points (x, y), the current focus of expansion $FOE_0$ (x0, y0) can be determined. When it is assumed that a motion vector (ui, vi) corresponding to an image point (xi, yi) (i=1, 2, . . . , N; N=natural number) is observed now, the following N equations can be obtained.

$$x0vi-y0ui=xivi-uiyi \text{ for } i=1,\ldots,N \qquad (2)$$

The FOE calculation unit 23 determines the current focus of expansion $FOE_0$ (x0, y0) by acquiring multiple motion vectors from the motion vector calculation unit 22, setting unknowns in the equation (2) as x0 and y0 and determining optimal solutions x0 and y0 which are optimal in the sense of least squares.

An example of a straight travel judgment method by the straight travel judgment unit 24 will be described.

It is known that a motion vector (u, v) corresponding to a point p (x, y, f) on the camera projection surface 31 corresponding to a target point P (X, Y, Z) can be expressed as follows:

$$u=xy(1/f)R_x-(x^2+f^2)(1/f)R_y+yR_z-f(T_x/z)+x(T_z/z) \qquad (3)$$

$$v(y^2+f^2)(1/f)R_x-xy(1/f)R_y-xR_z-f(T_y/z)+y(T_z/z) \qquad (4)$$

In the above equations, z indicates a value of a Z coordinate of the target point P. Camera movement parameters are indicted by Rx, Ry, Rz, Tx, Ty and Tz; rotation components of the camera 11 (the vehicle including the camera) are indicated by Rx, Ry and Rz; and relative translation components between the camera 11 (the vehicle including the camera) and the target point P are indicated by Tx, Ty and Tz.

At the time of straight travel, Rx=Ry=Rz=0 is satisfied. It is known that the ratio between u of the equation (3) and v of the equation (4) is equal to inclination from the point p (x, y) toward the $FOE_0$ (x0, y0). Therefore, the following equation (5) is obtained.

$$u/v = \{-f(T_x/z) + x(T_z/z)\}/\{-f(T_y/z) + y(T_z/z)\} \qquad (5)$$
$$= (x-x0)/(y-y0)$$

Because the origin of the camera 11 moves in parallel with the Z axis now, Tx=Ty=0 is satisfied. In this case, the following equation (6) is obtained.

$$u/v=x/y \qquad (6)$$

Apparent from the equation (5), at the time of straight travel, the inclination of the motion vector u/v is equal to the inclination from the point p (x, y), which is the target point P (X, Y, Z) projected on the camera projection surface 31, toward the current $FOE_0$. Apparent from the equation (6), if the camera 11 is mounted with the ideal mounting angle or if an image picked up by the camera 11 has been rotation-corrected by the coordinate rotation correction unit 21 so that the focus of expansion $FOE_0$ is converted to the target focus of expansion $FOE_1$, the current focus of expansion $FOE_0$ corresponds to the target focus of expansion $FOE_1$. In this case, the inclination u/v of the motion vector is equal to the inclination from the point p (x, y), which is the target point P (X, Y, Z) projected on the camera projection surface 31, toward the origin (target $FOE_1$) at the time of straight travel.

Therefore, the straight travel judgment unit 24 compares the inclination from the point p (x, y) on the camera projection surface 31 toward the current focus of expansion $FOE_0$ with the inclination of the motion vector (u, v) corresponding to the point p (x, y), and, if difference between the inclinations is within a predetermined difference, judges that the vehicle including the straight travel judgment unit 24 is traveling straight.

If it is judged by the straight travel judgment unit 24 that the vehicle is traveling straight, the FOE calculation unit 23 can determine the current focus of expansion $FOE_0$ (x0, y0) using motion vectors received from the motion vector calculation unit 22.

The amount-of-rotation-around-X/Y-axis calculation unit 25 acquires information about the coordinates (0, 0) of the target focus of expansion $FOE_1$ from the storage unit 13 and determines the amount of rotation around the X axis θx and the amount of rotation around the Y axis θy required to convert the current focus of expansion $FOE_0$ to the target focus of expansion $FOE_1$.

Figure 3A:
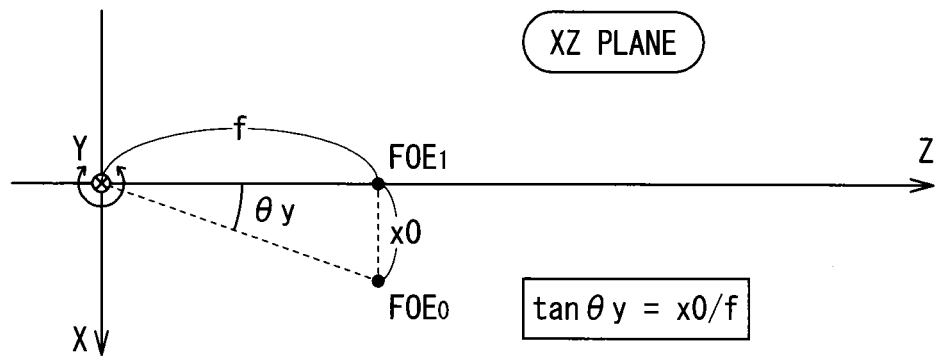
FIG. 3A is a diagram for illustrating the amount of rotation around the Y axis $\theta y$ for converting the current focus of expansion $FOE_0$ to the target focus of expansion $FOE_1$ according to the first embodiment.
Figure 3B:
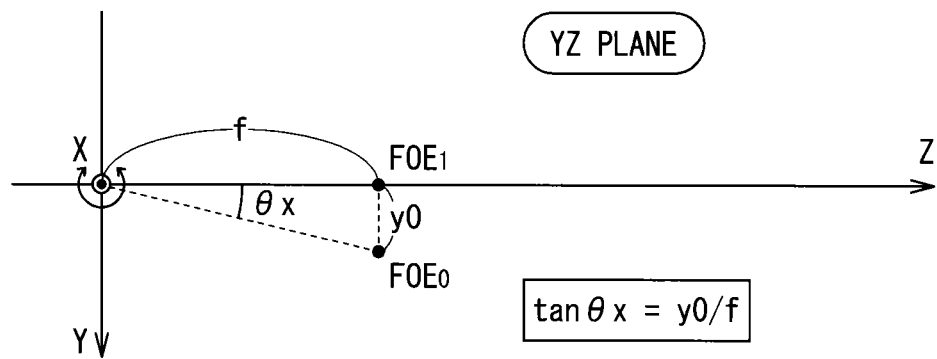
FIG. 3B is a diagram for illustrating the amount of rotation around the X axis $\theta x$ for converting the current focus of expansion $FOE_0$ to the target focus of expansion $FOE_1$ according to the first embodiment.

FIG. 3A is a diagram for illustrating the amount of rotation around the Y axis θy for converting the current focus of expansion $FOE_0$ to the target focus of expansion $FOE_1$ according to the first embodiment, and FIG. 3B is a diagram for illustrating the amount of rotation around the X axis θx for converting the current focus of expansion $FOE_0$ to the target focus of expansion $FOE_1$ according to the first embodiment. FIG. 3A shows the XZ plane in FIG. 2, and FIG. 3B shows the YZ plane in FIG. 2.

The direction of travel of the camera 11 (the direction of travel of the vehicle) can be indicated by a line connecting the origin (0, 0, 0) of the camera coordinate system and the focus of expansion $FOE_0$ on the camera projection surface 31. The inclination of this line from the Z axis can be shown by using the amount of rotation around the X axis θx and the amount of rotation around the Y axis θy. Apparent from FIGS. 3A and 3B, the amount of rotation around the X axis θx and the amount of rotation around the Y axis θy have the following relationship with the coordinates (x0, y0) of the current $FOE_0$.

$$\tan \theta x = y0/f \quad (7)$$

$$\tan \theta y = x0/f \quad (8)$$

Therefore, the amount-of-rotation-around-X/Y-axis calculation unit 25 determines the amount of rotation around the X axis θx and the amount of rotation around the Y axis θy from the equations (7) and (8) on the basis of the coordinates (x0, y0) of the current focus of expansion $FOE_0$ and gives them to the coordinate rotation correction unit 21.

Then, the coordinate rotation correction unit 21 performs rotation correction around the X axis and the Y axis for the image picked up by the camera 11 on the basis of the amount of rotation around the X axis θx and the amount of rotation around the Y axis θy determined by the amount-of-rotation-around-X/Y-axis calculation unit 25, respectively, so that θx=θy=0 is satisfied. As a result, the current focus of expansion $FOE_0$ corresponds to the target focus of expansion $FOE_1$ (0, 0); the optical axis of the camera 11 corresponds to the Z axis; and the Z axis is in parallel with the road surface.

Next, a method for acquiring the amount of rotation around the Z axis θz will be described. The amount of rotation around the Z axis θz can be determined as an amount of rotation around the Z axis for causing the road surface and the X axis to be in parallel with each other.

Figure 4:
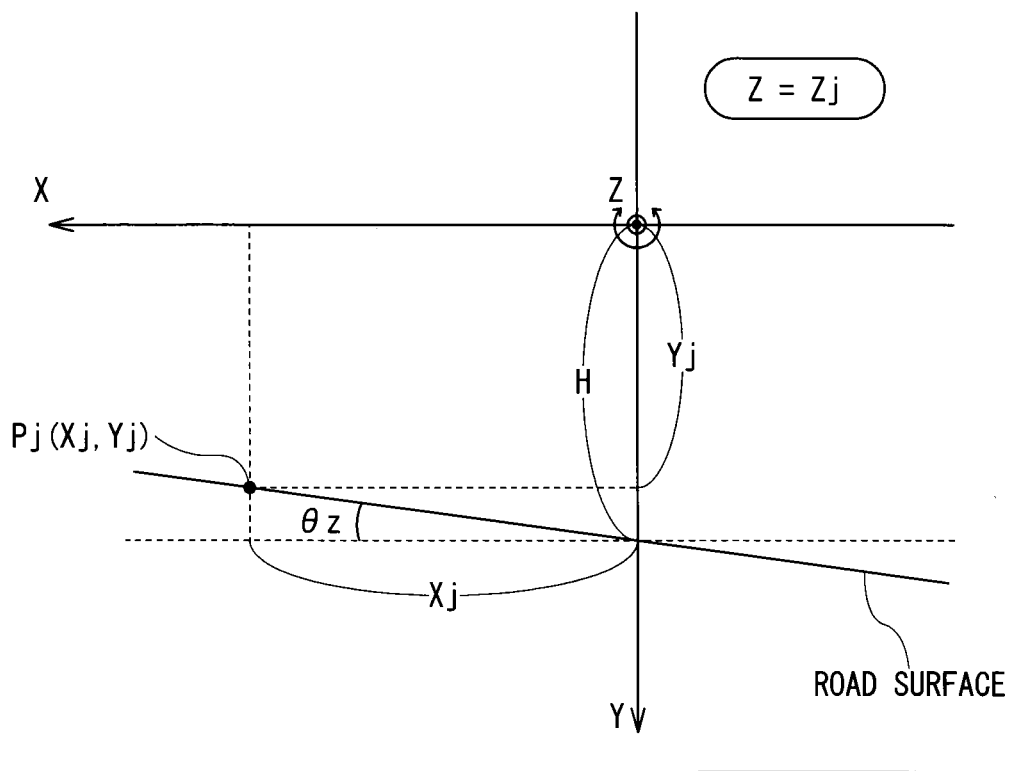
FIG. 4 is a diagram for illustrating the amount of rotation around the Z axis $\theta z$ for causing the road surface and the X axis to be in parallel with each other.

FIG. 4 is a diagram for illustrating the amount of rotation around the Z axis θz for causing the road surface and the X axis to be in parallel with each other. In the description below, it is assumed that the current focus of expansion $FOE_0$ corresponds to the target focus of expansion $FOE_1$ (0, 0), that the optical axis of the camera 11 corresponds to the Z axis, and that the Z axis is in parallel with the road surface.

If it is assumed that Z=z is satisfied, a relationship between three-dimensional coordinates P (X, Y, Z) in the camera coordinate system of a certain point P and coordinates p (x, y, f) in the screen coordinate system of a point p, which is the point P projected on the camera projection surface 31, can be expressed as follows:

$$X=zx/f \quad (9)$$

$$Y=zy/f \quad (10)$$

$$Z=z \quad (11)$$

Now, a point Pj (Xj, Yj, Zj) on the road surface will be considered. When it is assumed that, on a Z=Zj plane, an angle formed by the road surface and the X axis around the Z axis is indicated by θz, and the distance along the Y axis between the origin of the camera coordinate system and the road surface is indicated by H, as shown in FIG. 4, the following equation (12) is satisfied for the point Pj (Xj, Yj, Zj) on the road surface (see FIG. 4).

$$Yj = H - Xj \tan \theta z \quad (12)$$

Similarly, for a point Pk (Xk, Yk, Zk) also, the following equation (13) is satisfied.

$$Yk = H - Xk \tan \theta z \quad (13)$$

The following equation (14) can be derived from the equations (12) and (13).

$$\tan \theta z = -(Yk - Yj)/(Xk - Xj) \quad (14)$$

Using the equations (9) to (11), the equation (14) can be transformed as follows.

$$\tan \theta z = -(ykzk - yjzj)/(xkzk - xjzj) \quad (15)$$
$$= -(yk - yjzj/zk)/(xk - xjzj/zk)$$

By substituting Tx=Ty=0 and Rx=Ry=Rz=0 into the equations (3) and (4), the following equations (16) and (17) are obtained, respectively.

$$u = x(Tz/z) \quad (16)$$

$$v = y(Tz/z) \quad (17)$$

By integrating the equations (16) and (17), the following equation (18) is obtained.

$$Tz/z = (ux+vy)/(x^2+y^2) \quad (18)$$

On the basis of this equation (18), a distance standardization translation component (Tz/z)j of the point Pj can be determined from a motion vector (uj, vj) of a point pj (xj, yj), which is the point Pj on the road surface projected on the camera projection surface 31. The distance standardization translation component Tz/zj is expressed as (Tz/z)j. Similarly, (Tz/z)k for the point Pk on the road surface also can be determined.

Since both of (Tz/z)j and (Tz/z)k use the same Tz, the relationship of the following equation (19) is satisfied.

$$zj/zk=(Tz/z)k/(Tz/z)j \qquad (19)$$

Using this equation (19), the equation (15) can be transformed as follows:

$$\tan\theta z = -\{yk(Tz/z)j - yj(Tz/z)k\}/\{xk(Tz/z)j - xj(Tz/z)k\} \qquad (20)$$

By substituting the equation (18) into the equation (20) and transforming the obtained equation, the following equation (21) is obtained.

$$\{xk(ujxj+vjyj)(xk^2+yk^2)-xj(ukxk+vkyk)(xj^2+yj^2)\}\tan\theta z=-\{yk(ujxj+vjyj)(xk^2+yk^2)-yj(ukxk+vkyk)(xj^2+yj^2)\} \qquad (21)$$

It is assumed that an index indicating a combination of the two points Pj and Pk on the road surface is expressed as m=m(j, k). For example, if N points are obtained as points on the road surface, M, the number of combinations of the two points Pj and Pk extracted from among these points on the road surface, is expressed as follows: $M={}_2C_N=N(N-1)/2$. In this case, the index m is defined as m=1, 2, . . . , M.

If $a_m \tan\theta z$ and $b_m$ are substituted for the left-hand side and right-hand side of the equation (21), respectively, the equation (21) can be transformed as follows:

$$a_m \tan\theta z = b_m \qquad (22)$$

$$a_m = \{xk(ujxj+vjyj)(xk^2+yk^2)-xj(ukxk+vkyk)(xj^2+yj^2)\} \qquad (23)$$

$$b_m = -\{yk(ujxj+vjyj)(xk^2+yk^2)-yj(ukxk+vkyk)(xj^2+yj^2)\} \qquad (24)$$

From the equation (22), the least squares solution of tan θz is given by the following equation (25).

$$\tan\theta z = (\Sigma a_m b_m)/(\Sigma a_m^2) \text{ for } m=1, 2, \ldots M \qquad (25)$$

This equation (25) is an equation which associates the coordinates pj (xj, yj) and pk (xk, yk) of the points pj and pk on the camera projection surface 31 corresponding to the two points Pj and Pk on the road surface, the motion vectors (uj, vj) and (uk, vk) corresponding to the two points pj and pk, and the angle θz formed around the Z axis by the road surface and the X axis with one another.

Therefore, apparent from the equation (21), tan θz can be determined on the basis of the screen coordinates of the two points Pj and Pk on the road surface and the motion vectors corresponding to the two points. When not less than three points, i.e., three or more points on the road surface are extracted from the same picked-up image to obtain multiple M combinations of two points, more accurate tan θz can be obtained by using the equation (25).

As described above, at the time of determining the amount of rotation around the Z axis θz, points on the road surface projected on the camera projection surface 31 are used.

First, the road surface judgment unit 26 judges a road surface area in an image pickup screen of the camera 11. As a method for judging the road surface area, there is, for example, a method of judging such an area that motion vectors converge to the focus of expansion $FOE_0$ and that has a asphalt-like contrast, to be the road surface area. Since points in the road surface area (points on the road surface) are points related to a still object (road surface), corresponding motion vectors converge to the focus of expansion $FOE_0$ ($FOE_1$ if the current focus of expansion $FOE_0$ corresponds to the target focus of expansion $FOE_1$).

It is assumed that a picked-up image used for the road surface area judgment is a predetermined image among multiple images used by the motion vector calculation unit 22. For example, if the motion vector calculation unit 22 calculates a motion vector between a current image and a past image (for example, an image one frame before the current image), the current image can be used for the road surface area judgment. An example in which the picked-up image used for the road surface judgment is the current image will be described below.

The road surface point selection unit 27 selects three or more points from among points in an image area judged to be the road surface area by the road surface judgment unit 26 in the current image.

In this case, it is desirable that the road surface point selection unit 27 extracts only such points that satisfy a predetermined condition in order to reduce an error of calculation of the equation (25) and the like.

As the predetermined condition, it is conceivable, for example, that the points should be points that are away from $FOE_0$ (x0, y0) ($FOE_1$ if the current focus of expansion $FOE_0$ corresponds to the target focus of expansion $FOE_1$) by a predetermined distance (FOE distance threshold) th1 or more among the points pj in the image area corresponding to the points Pj on the road surface. This condition can be expressed by the following equation (26a) or (26b):

$$FOE \text{ distance threshold } th1 \leq \sqrt{\{(xj-x0)^2+(yj-y0)^2\}} \qquad (26a)$$

$$FOE \text{ distance threshold } th1 \leq |x-x0|+|y-y0| \qquad (26b)$$

Since the absolute value of a motion vector corresponding to a point belonging to an area close to a focus of expansion is small, its detection error rate is easily high. By extracting such a point pj that satisfies the condition expressed by the equation (26a) or (26b), a bad effect due to the error can be prevented.

In addition, it is also conceivable, as the predetermined condition, to use only such combinations that the distance between the extracted two points pj and pk is equal to or more than a predetermined distance-between-two-points threshold th2, for calculation of the equation (25). This condition can be expressed, for example, by the following equation (27):

$$\text{Distance-between-two-points threshold } th2 \leq |xk-xj| \qquad (27)$$

Since difference between (Tz/z)j and (Tz/z)k is generally slight, it is desirable from the viewpoint of an error to use such a combination of two points pj and pk that the value of |xk−xj| is large.

Then, the amount-of-rotation-around-Z-axis calculation unit 28 determines the least squares solution of tan θz on the basis of multiple combinations of two points extracted by the road surface point selection unit 27 and motion vectors corresponding to the two points of each combination, using the equation (25). Since θz a very small value, the value can be treated as tan θz≈θz. Therefore, the amount-of-rotation-around-Z-axis calculation unit 28 gives the least squares solution of tan θ to the coordinate rotation correction unit 21 as the amount of rotation around the Z axis θz for causing the road surface and the X axis to be in parallel with each other.

The amount-of-rotation-around-Z-axis calculation unit 28 may determine an average amount of rotation around the Z axis θz_ave by determining the amount of rotation around the Z axis θz for each of images picked up by the camera 11, storing it into a predetermined work area of the RAM and averaging a stored predetermined number of amounts of rotation around the Z axis θz. In this case, the amount-of-rotation-around-Z-axis calculation unit 28 gives the average amount of rotation around the Z axis θz_ave to the coordinate rotation correction unit 21. In the case of using θz_ave, it is possible to perform more reliable correction in comparison with θz because it is possible to reduce an error due to vibration of the vehicle which may be included in θz based on one frame.

Then, the coordinate rotation correction unit 21 performs rotation correction around the Z axis for the images picked up by the camera 11 so that θz_ave=0 is satisfied, on the basis of the amount of rotation around the Z axis θz or the average amount of rotation around the Z axis θz_ave determined by the amount-of-rotation-around-Z-axis calculation unit 28. As a result, the road surface and the X axis become in parallel with each other.

Next, an example of an operation of the onboard camera automatic calibration apparatus 10 according to the present embodiment will be described.

Figure 5:
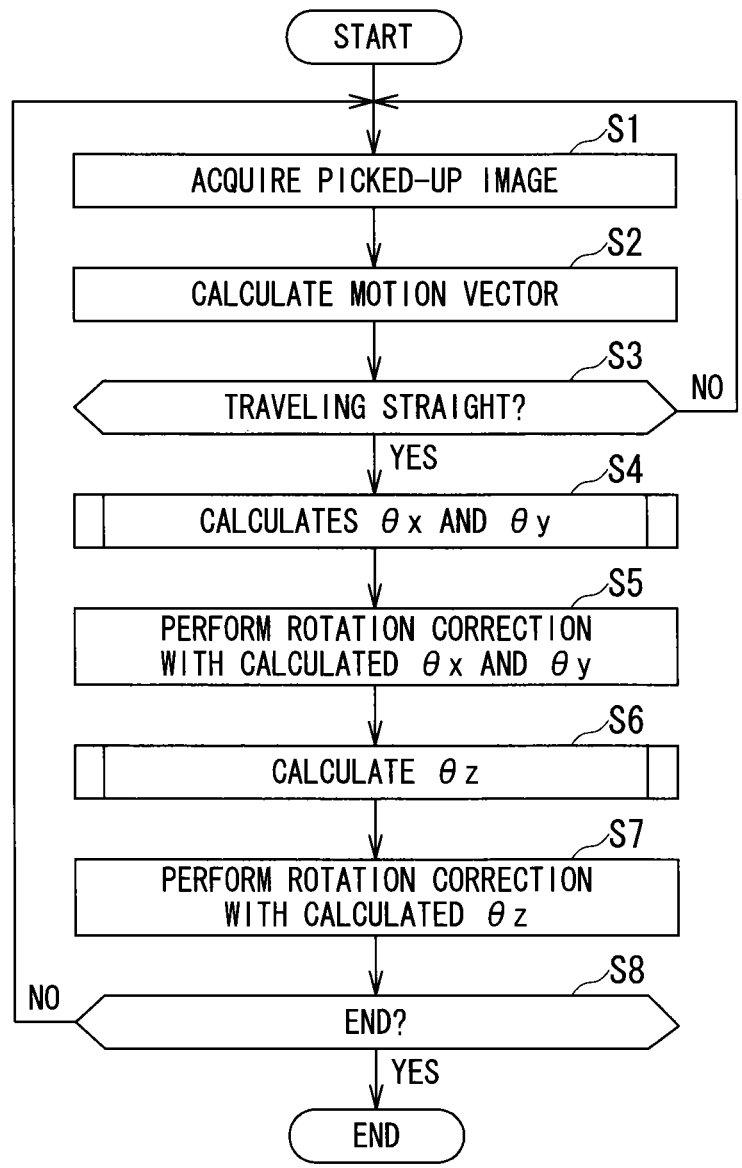
FIG. 5 is a flowchart showing a procedure for acquiring information about the mounting angle of the camera relative to a road surface while the vehicle is running, on the basis of an image acquired by the camera, and performing rotation correction of the image on the basis of this information, by the automatic calibration ECU shown in FIG. 1.

FIG. 5 is a flowchart showing a procedure for acquiring information about the mounting angle of the camera 11 relative to a road surface while the vehicle is running, on the basis of an image acquired by the camera 11, and performing rotation correction of the image on the basis of this information, by the automatic calibration ECU 12 shown in FIG. 1. In FIG. 5, a mark shown by S and a number indicates each step of the flowchart.

First, at step S1, the motion vector calculation unit 22 acquires image data of an image picked up by the camera 11. In the case of returning to step S1 from step 8, the motion vector calculation unit 22 acquires image data of an image picked up by the camera 11 for which rotation correction around the X and Y axes has been provided at step S5 and rotation correction around the Z axis has been provided at step S7 by the coordinate rotation correction unit 21.

Next, at step S2, the motion vector calculation unit 22 determines a motion vector (u, v) among multiple images on the basis of the acquired image data.

Next, at step S3, the straight travel judgment unit 24 judges whether the vehicle is traveling straight or not, on the basis of the motion vector. If the vehicle is traveling straight, the flow proceeds to step S4. On the other hand, if the vehicle is not traveling straight, the flow returns to step S1.

Next, at step S4, the automatic calibration ECU 12 determines the amount of rotation around the X axis θx and the amount of rotation around the Y axis θy required to convert the current focus of expansion $FOE_0$ to the target focus of expansion $FOE_1$.

Next, at step S5, the coordinate rotation correction unit 21 performs rotation correction of the image picked up by the camera 11 around the X axis and the Y axis on the basis of the amount of rotation around the X axis θx and the amount of rotation around the Y axis θy determined by the amount-of-rotation-around-X/Y-axis calculation unit 25, respectively, so that θx=θy=0 is satisfied. As a result, the current focus of expansion $FOE_0$ corresponds to the target focus of expansion $FOE_1$ (0, 0); the optical axis of the camera 11 corresponds to the Z axis; and the Z axis is in parallel with the road surface.

Next, at step S6, the automatic calibration ECU 12 determines the amount of rotation around the Z axis θz for causing the road surface and the X axis to be in parallel with each other or the average amount of rotation θz_ave obtained by averaging a predetermined number of amounts of rotation around the Z axis θz on the basis of multiple combinations of two points obtained among multiple points on the road surface and motion vectors corresponding to the two points of each combination.

Next, at step S7, the coordinate rotation correction unit 21 performs rotation correction around the Z axis for the images picked up by the camera 11 so that θz (or θz_ave)=0 is satisfied, on the basis of the amount of rotation around the Z axis θz or the average amount of rotation around the Z axis θz_ave determined by the amount-of-rotation-around-Z-axis calculation unit 28. As a result, the road surface and the X axis become in parallel with each other.

Next, at step S8, the automatic calibration ECU 12 judges whether the rotation correction of images is to be ended or not. For example, the automatic calibration ECU 12 can judge that the rotation correction is to be ended when the vehicle stops or steps S1 to S7 have been repeated a predetermined number of times. If it is judged that the rotation correction is to be ended, the procedure ends. On the other hand, if the rotation correction is not to be ended, the flow returns to step s1.

According to the above procedure, it is possible to acquire information about the mounting angle of the camera 11 relative to a road surface while the vehicle is running, on the basis of an image acquired by the camera 11, and perform rotation correction of the image on the basis of this information.

Next, a procedure for determining the amount of rotation around the X axis θx and the amount of rotation around the Y axis θy required to convert the current focus of expansion $FOE_0$ to the target focus of expansion $FOE_1$ will be described.

Figure 6:
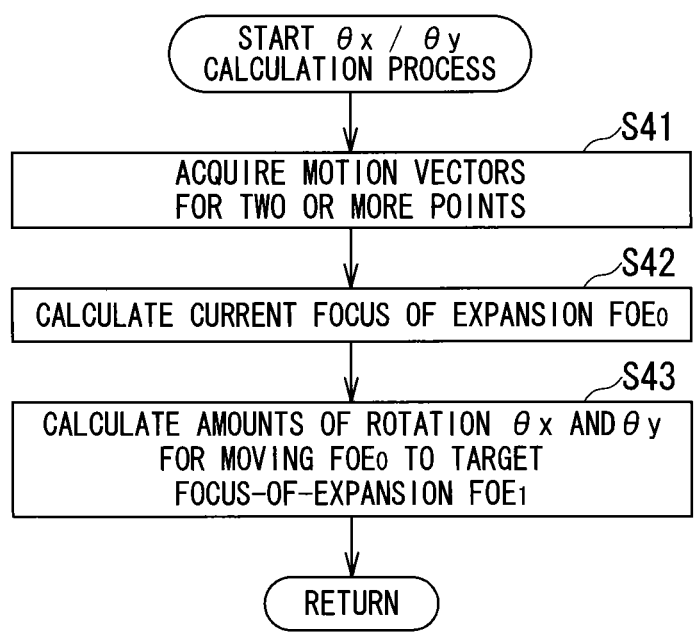
FIG. 6 is a subroutine flowchart showing a procedure for a $\theta x$, $\theta y$ calculation process executed at step S4 in FIG. 5.

FIG. 6 is a subroutine flowchart showing a procedure for a θx, θy calculation process executed at step S4 in FIG. 5.

At step S41, the FOE calculation unit 23 acquires motion vectors of two or more image points from the motion vector calculation unit 22.

Next, at step S42, the FOE calculation unit 23 determines the current focus of expansion $FOE_0$ (x0, y0) using the equation (2), on the basis of the acquired motion vectors of the two or more image points.

Next, at step S43, the amount-of-rotation-around-X/Y-axis calculation unit 25 acquires information about the coordinates (0, 0) of the target $FOE_1$ from the storage unit 13. Then, the amount-of-rotation-around-X/Y-axis calculation unit 25 determines the amount of rotation around the X axis θx and the amount of rotation around the Y axis θy from the equations (7) and (8) on the basis of the coordinates (x0, y0) of the current focus of expansion $FOE_0$ and gives them to the coordinate rotation correction unit 21.

According to the above procedure, it is possible to determine the amount of rotation around the X axis θx and the amount of rotation around the Y axis θy required to convert the current focus of expansion $FOE_0$ to the target focus of expansion $FOE_1$.

Next, description will be made on a procedure for determining the average amount of rotation around the Z axis θz_ave obtained by averaging a predetermined amounts of rotation around the Z axis θz among amounts of rotation around the Z axis θz determined for picked-up images on the basis of multiple combinations of two points obtained among multiple points on a road surface and motion vectors corresponding to the two points of each combination.

Figure 7:
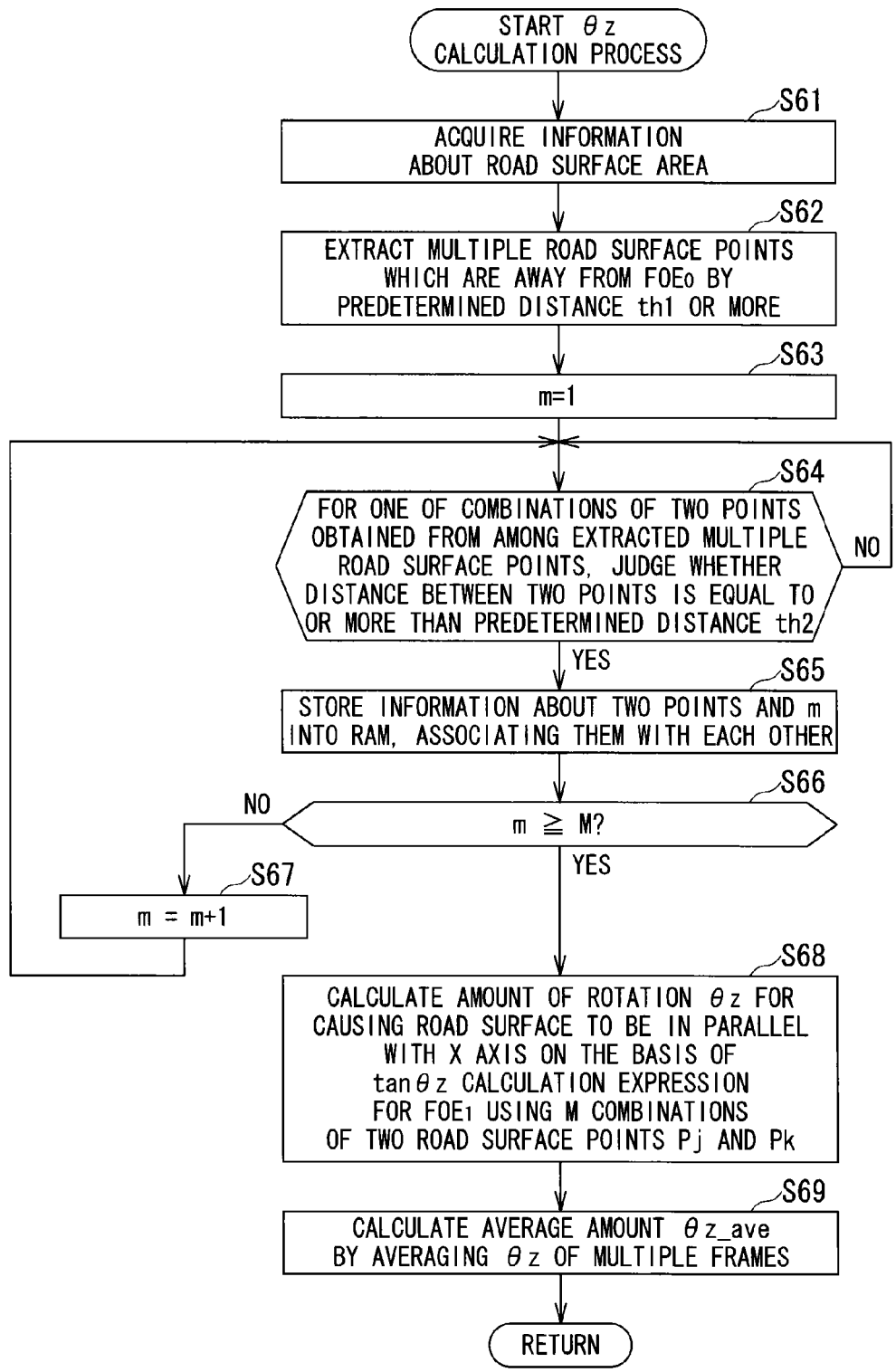
FIG. 7 is a subroutine flowchart showing a procedure according to the first embodiment for the $\theta z$ calculation process executed at step S6 in FIG. 5.

FIG. 7 is a subroutine flowchart showing a procedure according to the first embodiment for the θz calculation process executed at step S6 in FIG. 5. FIG. 7 shows a procedure for determining the average amount of rotation around the Z axis θz_ave obtained by averaging a predetermined number of amounts of rotation around the Z axis θz among amounts of rotation around the Z axis θz determined for picked-up images. In the case of determining the amount of rotation around the Z axis θz corresponding to one picked-up image, step S69 can be omitted.

At step S61, the road surface judgment unit 26 judges a road surface area in an image pickup screen of the camera 11.

Next, at step S62, the road surface point selection unit 27 selects multiple points that are away from the current focus of expansion $FOE_0$ (x0, y0) (from $FOE_1$ if the current focus of expansion $FOE_0$ corresponds to the target focus of expansion $FOE_1$) by the FOE distance threshold th1 or more, from among points in an image area corresponding to points on the road surface, using the equation (26a) or (26b).

Next, at step S63, the road surface point selection unit 27 sets the index m to 1 and stores it in a predetermined work area in the RAM. This index m is an index indicating the number of combinations of two points.

Next, at step S64, the road surface point selection unit 27 judges, for one of the combinations of two points obtained from among the multiple road surface points extracted at step S62, whether the two points are away from each other by the distance-between-two-points threshold th2 or more. If the points of the combination are away from each other by the distance-between-two-points threshold th2 or more, the flow proceeds to step S65. On the other hand, if the distance between the points of the combination is shorter than the distance-between-two-points threshold th2, this combination is discarded, and the judgment is performed again for another combination.

Next, at step S65, the road surface point selection unit 27 stores information about the two points judged to be away from each other by the distance-between-two-points threshold th2 or more at step S64 and the value of the current index m in a predetermined work area of the RAM, associating them with each other.

Next, at step S66, the road surface point selection unit 27 judges whether or not the index m is equal to or larger than a predetermined number M. If the index m is equal to or larger than the predetermined number M, the flow proceeds to step S68. On the other hand, if the index m is smaller than the predetermined number M, the index m is increased by one at step S67, and the flow returns to step S64 to judge, for another combination, whether or not the points of the combination are away from each other by the distance-between-two-points threshold th2 or more.

Next, at step S68, the amount-of-rotation-around-Z-axis calculation unit 28 calculates the amount of rotation θz for causing the road surface to be in parallel with the X axis on the basis of the equation (25) (tan θz calculation expression for $FOE_1$) using M combinations of two road surface points Pj and Pk and stores the amount of rotation θz into a predetermined work area of the RAM.

Next, at step S69, the amount-of-rotation-around-Z-axis calculation unit 28 determines the average amount of rotation around the Z axis θz_ave by averaging a predetermined number of amounts of rotation around the Z axis θz among amounts of rotation around the Z axis θz determined for picked-up images and gives it to the coordinate rotation correction unit 21.

According to the above procedure, it is possible to determine the average amount of rotation around the Z axis θz_ave obtained by averaging a predetermined amounts of rotation around the Z axis θz on the basis of multiple combinations of two points obtained among multiple points on the road surface and motion vectors corresponding to the two points of each combination.

Though FIG. 7 shows an example of the case of extracting a predetermined number M of combinations of two points, it is also possible to extract all extractable combinations of two points and use the equation (25) at step S68 with the extracted number as M.

The onboard camera automatic calibration apparatus 10 according to the present embodiment can acquire information about the mounting angle of the camera 11 relative to a road surface (θx, θy and θz_ave (or θz)) while the vehicle is running, on the basis of an image acquired by the camera 11, and perform rotation correction of the image on the basis of this information. Thus, according to the onboard camera automatic calibration apparatus 10, it is possible to automatically calibrate the mounting angle of the camera 11 while the vehicle is running.

Therefore, for example, if the camera 11 is an image pickup apparatus for monitoring the back of the vehicle, it is possible to automatically calibrate the camera 11 without causing a user to feel stress, by performing the rotation correction described above at the time of straight-ahead travel when the camera 11 for monitoring the back is not used frequently.

As for θx, θy and θz, they are calculated for each frame when the vehicle is running on the road surface and traveling straight, that is, when an image suitable for calibration can be obtained. Furthermore, by determining an inter-frame average of θz, which is calculated on the basis of one frame, it is possible to calculate more reliable θz_ave.

Furthermore, the onboard camera automatic calibration apparatus 10 according to the present embodiment does not merely obtain combinations of two points equal to half of the number of road surface points in order of extracting road surface points or the like, but can obtain combinations of two points equal to the number of possible combinations of two points picked out from among multiple road surface points. Therefore, it is possible to obtain the number of plots of a function expressed by the equation (22) larger than the number of obtained motion vectors, that is, equal to the number of possible combinations of the motion vectors, and, therefore, θz obtained by the equation (25) can be a more accurate value. Furthermore, by applying the FOE distance threshold th1 or the distance-between-two-points threshold th2 at the time of extracting points on a road surface used for calculation of θz, it is possible to reduce an error caused at the time of calculating θz.

Second Embodiment

Next, a second embodiment of the onboard camera automatic calibration apparatus according to the present invention will be described.

Figure 8:
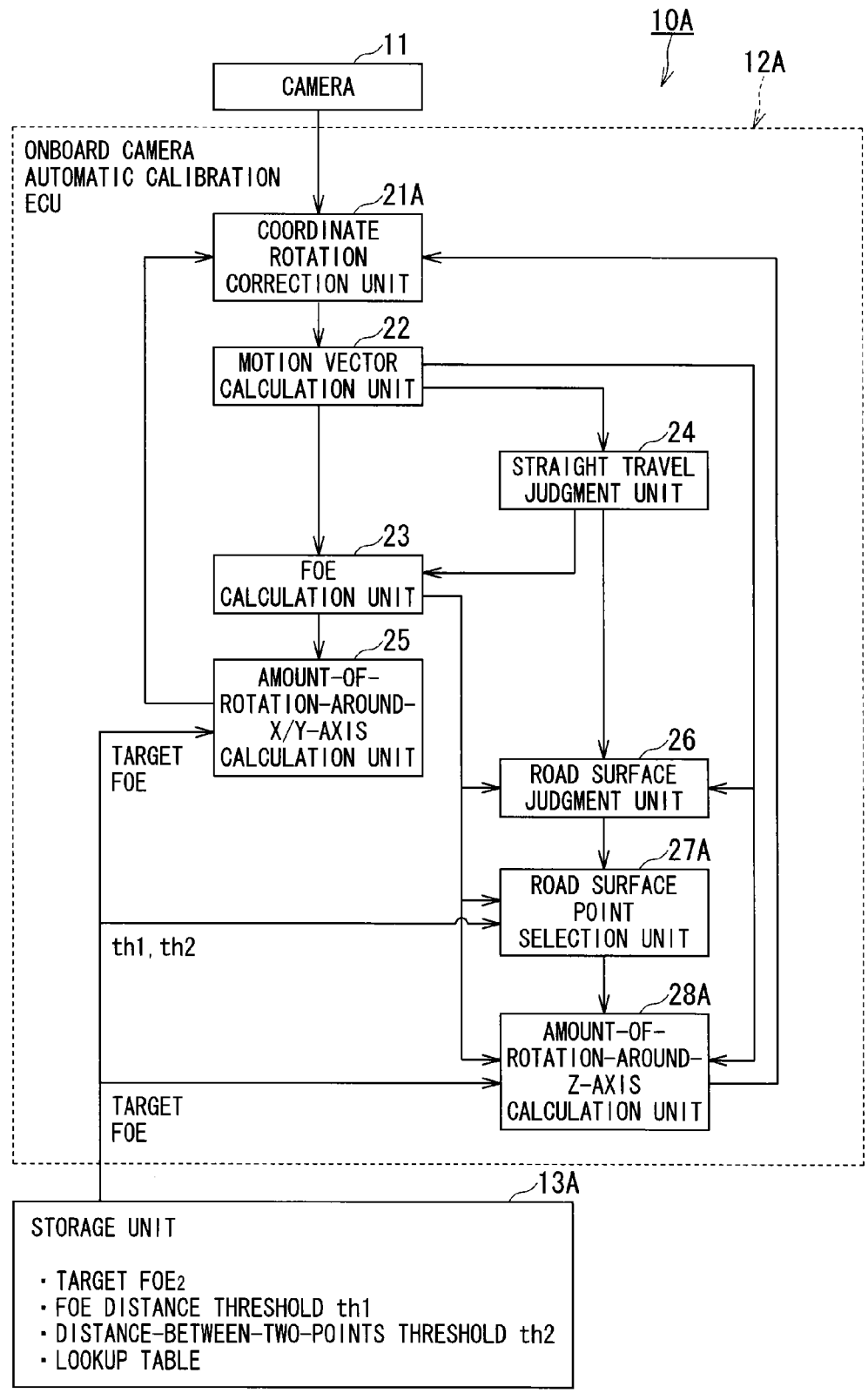
FIG. 8 is a whole block diagram showing an example of an onboard camera automatic calibration apparatus according to the second embodiment of the present invention.

FIG. 8 is a whole block diagram showing an example of an onboard camera automatic calibration apparatus 10A according to the second embodiment of the present invention.

The onboard camera automatic calibration apparatus 10A shown in the second embodiment is different from the onboard camera automatic calibration apparatus 10 shown in the first embodiment in that a position where the optical axis of the camera 11 inclines by θ0 from a line in parallel with a road surface is a calibration target position. Since components and operation are substantially the same as those of the onboard camera automatic calibration apparatus 10 shown in FIG. 1, the same components are given the same reference numerals, and description thereof will be omitted.

As the angle θ0, it is desirable to adopt such an angle that one to four percent on the upper side of an image picked up by the camera 11 is empty. For example, when about ⅓ on the upper side is empty, the horizon is positioned at about ⅓ on the upper side, and a road surface is to be shown below the horizon.

A storage unit 13A stores a target $FOE_2$ (x2, y2) which is information about the coordinates of a target focus of expansion according to this embodiment, an FOE distance threshold th1, a distance-between-two-points threshold th2 and a lookup table. These pieces of information may be updated via the electronic network or via a portable storage medium such as an optical disk.

The target $FOE_2$ (x2, y2) according to the second embodiment is set to (0, y2) (target $FOE_2$=(0, y2)) so that the optical axis of the camera 11 inclines by θ0 from a line in parallel with the road surface. This target $FOE_2$ is used for correction of rotation around X and Y axes by an automatic calibration ECU 12A.

Figure 9:
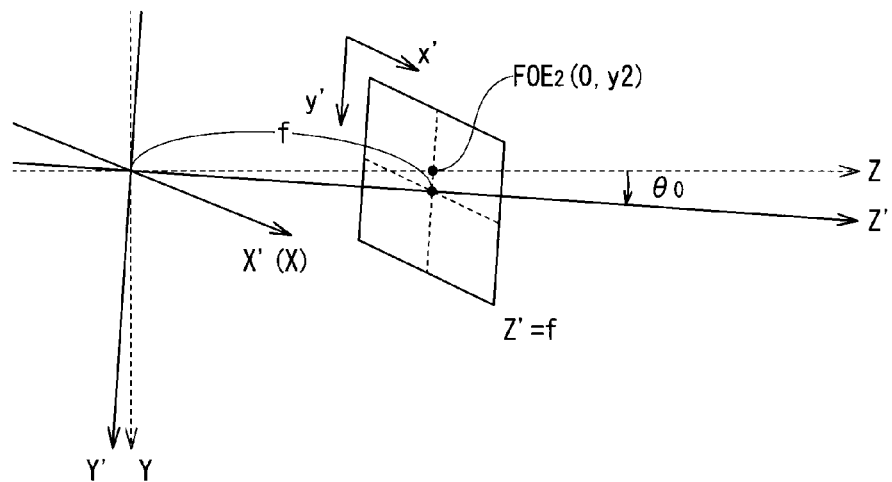
FIG. 9 is a diagram showing a relationship between a camera coordinate system according to the second embodiment and a screen coordinate system on a camera projection surface.

FIG. 9 is a diagram showing a relationship between a camera coordinate system according to the second embodiment and a screen coordinate system on a camera projection surface 31. The camera coordinate system according to the second embodiment is given as (X', Y', Z'), and a screen coordinate system is given as (x', y' (, z')). As for (X, Y, Z), it is the same as the camera coordinate system according to the first embodiment. When it is not necessary to distinguish the camera coordinate system according to the present embodiment from the camera coordinate system according to the first embodiment, the camera coordinate system according to the present embodiment is given as (X, Y, Z) for convenience.

As shown in FIG. 9, the camera coordinate system according to the second embodiment is a coordinate system which has the same origin as the camera coordinate system according to the first embodiment and which has been rotated coordinate system are defined to be inclined by θ0 relative to the Z and Y axes of the camera coordinate system according to the first embodiment, respectively. The X' axis of the camera coordinate system corresponds to the X axis (the lateral direction of the vehicle) of the camera coordinate system according to the first embodiment. The origin (0, 0) (or (0, 0, f)) of the screen coordinate system is assumed to be a point of intersection between the Z' axis of the camera coordinate system and the camera projection surface 31.

In the second embodiment, an image obtained by the camera 11 is rotation-corrected so that the optical axis of the camera 11 is inclined by θ0 from a line in parallel with the road surface.

As described above, the direction of travel of the camera 11 can be indicated by a line connecting the origin of the camera coordinate system (X', Y', Z')=(0, 0, 0) and a focus of expansion on the camera projection surface 31. Therefore, in the present embodiment, when the camera 11 is mounted with an ideal mounting angle, that is, when the optical axis direction corresponds to the Z' axis, the coordinates of the focus of expansion corresponds to a target focus of expansion $FOE_2$ (0, y2).

Therefore, similar to the first embodiment, the amount-of-rotation-around-X/Y-axis calculation unit 25 determines an amount of rotation around the X' axis θx' (hereinafter referred to as the amount of rotation around the X axis θx for convenience) and an amount of rotation around the Y' axis θy' (hereinafter referred to as the amount of rotation around the Y axis θy for convenience) from the equations (7) and (8) on the basis of the coordinates of the current focus of expansion $FOE_0$ (x0, y0), and gives them to a coordinate rotation correction unit 21A.

Then, the coordinate rotation correction unit 21A of the automatic calibration ECU 12A according to the present embodiment performs rotation correction around the X' axis and the Y' axis for the image picked up by the camera 11 on the basis of the amount of rotation around the X axis θx and the amount of rotation around the Y axis θy determined by the amount-of-rotation-around-X/Y-axis calculation unit 25, respectively, so that θx=θ0 (=$\tan^{-1}$(y2/f)) and θy=0 are satisfied. As a result, the current focus of expansion $FOE_0$ corresponds to the target focus of expansion $FOE_2$ (0, y2), and the optical axis (the Z' axis) of the camera 11 is inclined by the angle θ0 relative to a line in parallel with the road surface.

Next, a method for acquiring an amount of rotation around the Z' axis according to the second embodiment (hereinafter referred to as the amount of rotation around the Z axis θz with "'" omitted in order to avoid complicatedness) will be described. The amount of rotation around the Z axis θz can be determined as an amount of rotation around the Z' axis for causing the road surface and the X' axis (=X axis) to be in parallel with each other.

Figure 10:
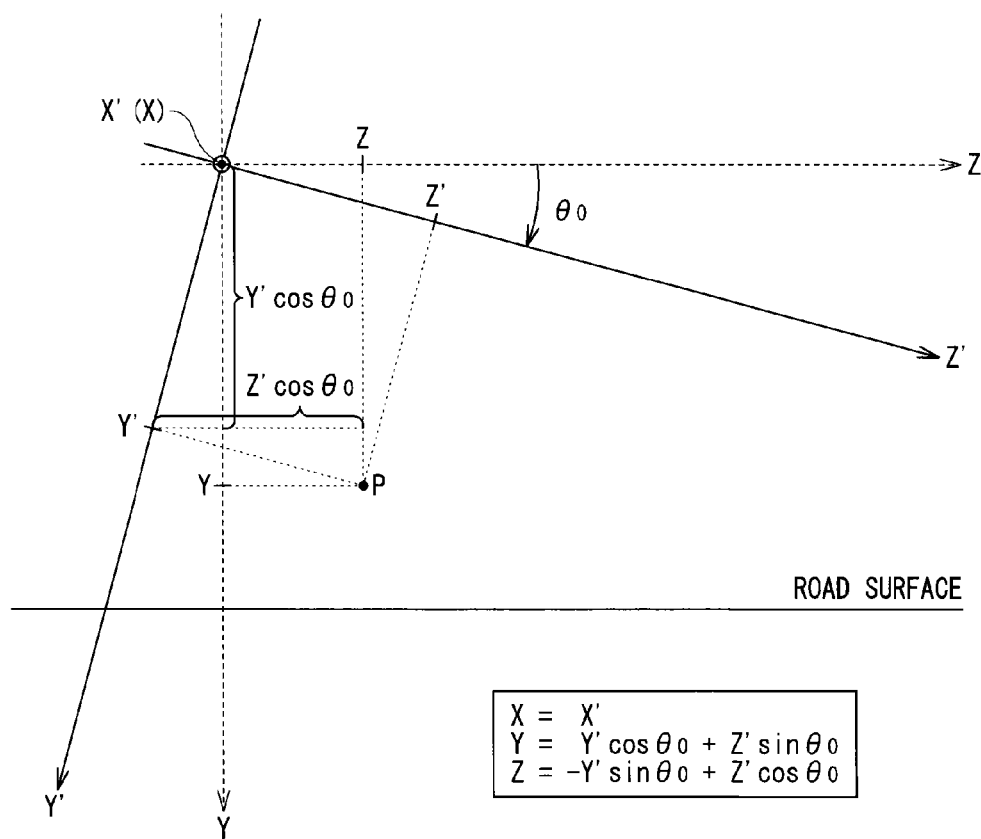
FIG. 10 is a diagram showing a relationship between the camera coordinate system according to the first embodiment and the camera coordinate system according to the second embodiment.

FIG. 10 is a diagram showing a relationship between the camera coordinate system according to the first embodiment and the camera coordinate system according to the second embodiment. The plane in FIG. 10 corresponds to the YZ (Y'Z') plane in FIG. 9.

First, the camera coordinate system (X', Y', Z') according to the present embodiment is converted to the camera coordinate system (X, Y, Z) according to the first embodiment.

$$X = X' \tag{28}$$

$$Y = Y' \cos\theta0 + Z' \sin\theta0 \tag{29}$$

$$Z = -Y' \sin\theta0 + Z' \cos\theta0 \tag{30}$$

Between the camera coordinate system (X', Y', Z') and the screen coordinate (x', y', z') according to the present embodiment, the same relationships as the equations (9) to (11) are satisfied. Therefore, by substituting the equations (28) to (30) and using the equations (9) to (11), the equation (14) can be transformed to the following equation (31).

$$\begin{aligned}
\tan\theta z &= -(Yk - Yj)/(Xk - Xj) \\
&= -(Yk'\cos\theta0 + Zk'\sin\theta0 - Yj'\cos\theta0 - Zj'\sin\theta0)/(Xk' - Xj') \\
&= -(yk'zk'\cos\theta0 + zk'f\sin\theta0 - yj'zj'\cos\theta0 - zj'f\sin\theta0)/(xk'zk' - xj'zj') \\
&= -\{(yk'\cos\theta0 + f\sin\theta0)zk' - (yj'\cos\theta0 + f\sin\theta0)zj'\}/(xk'zk' - xj'zj') \\
&= -\{yk'\cos\theta0 + f\sin\theta0 - (zj'/zk')(yj'\cos\theta0 + f\sin\theta0)\}/\{xk' - (zj'/zk')xj'\}
\end{aligned} \tag{31}$$

By substituting the equation (19) into the equation (31) and using tan θ0=y2/f (y2: the y coordinate of the target focus of expansion $FOE_2$), the following equation (32) is obtained.

$$\tan\theta z = -[yk'\cos\theta 0 + f\sin\theta 0 - \{(Tz/z)k'/(Tz/z)j'\} * (yj'\cos\theta 0 + f\sin\theta 0)]/[xk' - \{(Tz/z)k'/(Tz/z)j'\}xj'] \qquad (32)$$

$$= -[(Tz/z)j'(yk'\cos\theta 0 + f\sin\theta 0) - (Tz/z)k' * (yj'\cos\theta 0 + f\sin\theta 0)]/[(Tz/z)j'xk' - (Tz/z)k'xj']$$

$$= -\{f/\sqrt{(f^2 + y2^2)}\}[(tz/z)j'(yk' + y2) - (Tz/z)k'(yj' + y2)]/\{(Tz/z)j'xk' - (Tz/z)k'xj'\}$$

By substituting the equation (18) into the equation (32), the following equation (33) is obtained. In the description below, the apostrophe (') will be omitted to avoid complicatedness.

$$\{xk(ujxj + vjyj)(xk^2 + yk^2) - xj(ukxk + vkyk)(xj^2 + yj^2)\}\tan\theta z = \qquad (33)$$
$$-\{f/\sqrt{(f^2 + y2^2)}\}[(yk + y2)(ujxj + vjyj)(xk^2 + yk^2) -$$
$$(yj + y2)(ukxk + vkyk)(xj^2 + yj^2)]$$

This equation (33) corresponds to the equation (21). If, similarly to the equation (21), $a_m \tan\theta z$ and $b_m$ are substituted for the left-hand side and right-hand side of the equation (33) when an index indicating a combination of two points Pj and Pk on a road surface is given as m=m(j, k), the equation (33) can be transformed as follows:

$$a_m \tan\theta z = b_m \qquad (34)$$

$$a_m = \{xk(ujxj + vjyj)(xk^2 + yk^2) - xj(ukxk + vkyk)(xj^2 + yj^2)\} \qquad (35)$$

$$b_m = -\{f/\sqrt{(f^2 + y2^2)}\}[(yk + y2)(ujxj + vjyj)(xk^2 + yk^2) - \qquad (36)$$
$$(yj + y2)(ukxk + vkyk)(xj^2 + yj^2)]$$

From the equation (34), the least squares solution of tan θz is given by the following equation (37).

$$\tan\theta z = (\Sigma a_m b_m)/(\Sigma a_m^2) \text{ for } m=1, 2, \ldots M \qquad (37)$$

Therefore, similarly to the first embodiment, an amount-of-rotation-around-Z-axis calculation unit 28A can determine tan θz from the equation (37) on the basis of multiple M combinations of two points pj and pk in a frame.

Figure 11:
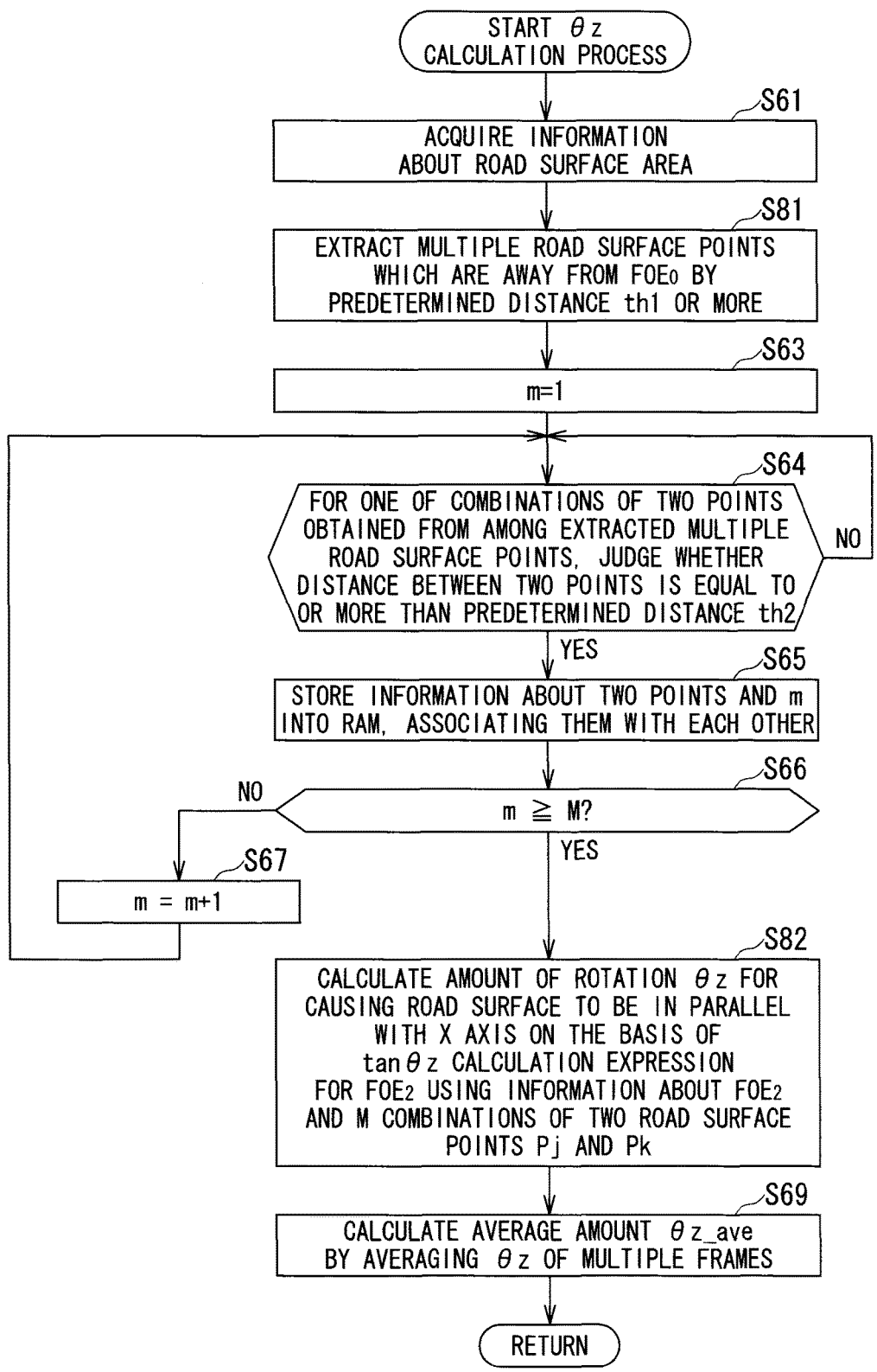
FIG. 11 is a subroutine flowchart showing a procedure according to the second embodiment for the $\theta z$ calculation process executed at step S6 in FIG. 5.

FIG. 11 is a subroutine flowchart showing a procedure according to the second embodiment for the θz calculation process executed at step S6 in FIG. 5. Steps equal to those in FIG. 7 are given the same reference numerals, and redundant description will be omitted.

At step S81, a road surface point selection unit 27A selects multiple points that are away from the current focus of expansion $FOE_0$ (x0, y0) (from $FOE_2$ if the current focus of expansion $FOE_0$ corresponds to the target focus of expansion $FOE_2$) by the FOE distance threshold th1 or more, from among points in an image area corresponding to points on the road surface, using the equation (26a) or (26b).

At step S82, the amount-of-rotation-around-Z-axis calculation unit 28A calculates the amount of rotation θz for causing the road surface to be in parallel with the X axis on the basis of the equation (34) (tan θz calculation expression for $FOE_2$) using M combinations of two road surface points Pj and Pk and stores the amount of rotation θz into a predetermined work area of the RAM. Then, at step S69, the amount-of-rotation-around-Z-axis calculation unit 28A determines the average amount of rotation around the Z axis θz_ave by averaging a predetermined number of amounts of rotation around the Z axis θz among amounts of rotation around the Z axis θz determined for picked-up images and gives it to the coordinate rotation correction unit 21A.

According to the onboard camera automatic calibration apparatus 10A according to the second embodiment also, since it is possible to acquire information about the mounting angle of the camera 11 relative to a road surface (θx, θy, θz_ave (or θz)) while the vehicle is running, on the basis of an image acquired by the camera 11, it is possible to automatically calibrate the mounting angle of the camera 11 while the vehicle is running.

Furthermore, according to the onboard camera automatic calibration apparatus 10A according to the present embodiment, since it is possible to set a position where the optical axis of the camera 11 is inclined by θ0 from a line in parallel with a road surface as a calibration target position, it is possible to set the position of the horizon in an image picked up by the camera 11 to any position according to θ0.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

Moreover, though the embodiment of the invention discloses an example of processing where the steps in the flowchart are carried out in time series in the described order, the steps of the processing need not necessarily carried out in time series and can be executed in parallel or individually.

What is claimed is:

1. An onboard camera automatic calibration apparatus comprising:
a camera provided on a vehicle arranged such that an optical axis of the camera is inclined downward by a predetermined angle from a line parallel with a road surface, the line being parallel with a direction of travel of the vehicle, the camera being configured to obtain multiple images of surroundings of the vehicle while the vehicle moves; and
processing circuitry configured to:
determine, in a camera coordinate system with the optical axis as a Z axis being inclined downward and with a lateral direction of the vehicle as an X axis, motion vectors among the multiple images obtained by the camera while the vehicle moves;
determine focus-of-expansion coordinates using the motion vectors;
determine, using the motion vectors, whether the vehicle is traveling straight or not;
determine, when the vehicle is determined to be traveling straight, in the camera coordinate system with the optical axis Z being inclined downward, an amount of rotation around the X axis and an amount of rotation around a Y axis for converting the current focus-of-expansion coordinates to target focus-of-expansion coordinates;

perform, while the vehicle is determined to be traveling straight, rotation correction around the X axis and around the Y axis for the images obtained by the camera based on the determined amount of rotation around the X axis and the determined amount of rotation around the Y axis;

select, when the vehicle is determined to be traveling straight, points not less than three on the road surface in a predetermined image among the multiple images obtained while the vehicle is determined to be traveling straight and select multiple combinations of two points from among the points not less than three on the road surface;

determine, when the vehicle is determined to be traveling straight, in the camera coordinate system with the optical axis as the Z axis being inclined downward, an amount of rotation around the Z axis such that the road surface is parallel to the X axis, based on the multiple combinations of the two points and motion vectors each corresponding to each point of the multiple combinations of the two points; and perform, while the vehicle is determined to be traveling straight, rotation correction around the Z axis for the images subjected to the rotation correction around the X axis and around the Y axis obtained by the camera based on the determined amount of rotation around the Z axis.

2. The apparatus according to claim 1, wherein
the processing circuitry determines a predetermined number of amounts of rotation around the Z axis, each amount of rotation around the Z axis derived from one predetermined image, and determines an average amount of rotation around the Z axis by averaging the predetermined number of amounts of rotation around the Z axis; and the processing circuitry performs rotation correction around the Z axis for the images obtained by the camera based on the average amount of rotation around the Z axis.

3. The apparatus according to claim 1, wherein
the target focus-of-expansion coordinates are coordinates away from the origin of the predetermined image by a predetermined distance in the Y axis direction; and the processing circuitry determines the amount of rotation around the Z axis such that the road surface is parallel to the X axis based on the multiple combinations of the two points, motion vectors corresponding to the two points of each combination, and the target focus-of-expansion coordinates, using an expression associating coordinates of the two points on the road surface on the predetermined image, the motion vectors corresponding to the two points, an angle formed by the road surface and the X axis, and the target focus-of-expansion coordinates.

4. The apparatus according to claim 1, wherein
the processing circuitry selects multiple points that are points on the road surface within the predetermined image as well as being away from the focus-of-expansion coordinates obtained from the multiple motion vectors by a distance equal to or above a first threshold.

5. The apparatus according to claim 1, wherein
the processing circuitry selects, from among the combinations of the two points selected from the points not less than three, multiple such combinations that a distance between the two points is equal to or above a second threshold.

6. The apparatus according to claim 1, wherein the processing circuitry is further configured to:
determine that the vehicle is traveling straight in a case where a difference between an inclination from a point on an image obtained while the vehicle moves toward the focus-of-expansion coordinates and an inclination of a motion vector corresponding to the point is within a predetermined difference.

7. The apparatus according to claim 1, wherein the processing circuitry determines the amount of rotation around the Z axis such that the road surface is parallel to the X axis based on the multiple combination of the two points and motion vectors corresponding to the two points of each combination, using an expression associating coordinates of the two points on the road surface on the predetermined image, the motion vectors corresponding to the two points and an angle formed by the road surface and the X axis.

8. A method of calibrating an onboard camera on a vehicle, comprising:
obtaining multiple images of surroundings of the vehicle, using the camera while the vehicle moves, the camera being provided on the vehicle such that an optical axis of the camera is inclined downward by a predetermined angle from a line parallel with a road surface, the line being parallel with a direction of travel of the vehicle;

determining, in a camera coordinate system with the optical axis as a Z axis being inclined downward and with a lateral direction of the vehicle as an X axis, motion vectors among the multiple images obtained by the camera while the vehicle moves;

determining focus-of-expansion coordinates using the motion vectors;

determining, using motion vectors, whether the vehicle is traveling straight or not;

determining, when the vehicle is determined to be traveling straight, in the camera coordinate system with the optical axis as the Z axis being inclined downward, an amount of rotation around the X axis and an amount of rotation around a Y axis for converting the current focus-of-expansion coordinates to target focus-of-expansion coordinates;

performing, while the vehicle is determined to be traveling straight, rotation correction around the X axis and around the Y axis for the images obtained by the camera based on the determined amount of rotation around the X axis and the determined amount of rotation around the Y axis;

selecting, when the vehicle is determined to be traveling straight, points not less than three on the road surface in a predetermined image among the multiple images obtained while the vehicle is determined to be traveling straight and selecting multiple combinations of two points from among the points not less than three on the road surface;

determining, when the vehicle is determined to be traveling straight, in a camera coordinate system with the optical axis as the Z axis being inclined downward, an amount of rotation around the Z axis such that the road surface is parallel to the X axis, based on the combinations of the two points and motion vectors corresponding to the two points; and performing, while the vehicle is determined to be traveling straight, a rotation correction around the Z axis for the images subjected to the rotation correction around the X axis and around the Y axis obtained by the camera based on the amount of rotation around the Z axis.

9. A non-transitory computer readable medium having instructions stored therein which causes, when executed by a computer, to execute the steps of the method according to claim 8.

10. The method according to claim 8, further comprising:
determining that the vehicle is traveling straight in a case where difference between an inclination from a point on a image obtained while the vehicle moves toward the focus-of-expansion coordinates and an inclination of the motion vector corresponding to the point is within a predetermined difference.

\* \* \* \* \*